US006059656A

United States Patent [19]
Satzler

[11] Patent Number: 6,059,656
[45] Date of Patent: May 9, 2000

[54] VARIABLE SPEED DRIVE SYSTEM FOR A SYSTEM FOR A ROTOR ASSEMBLY OF A GRAIN THRESHING MECHANISM

[75] Inventor: Ronnie L. Satzler, Princeville, Ill.

[73] Assignee: Caterpillar Inc., Peoria, Ill.

[21] Appl. No.: 09/085,938

[22] Filed: May 28, 1998

[51] Int. Cl.[7] .................................................. A01F 12/56
[52] U.S. Cl. ............................................ 460/116; 56/14.6
[58] Field of Search ................................ 460/6, 116, 119, 460/150; 56/14.6, 10.2 G, 10.2 H, DIG. 15

[56] References Cited

U.S. PATENT DOCUMENTS

| | | | |
|---|---|---|---|
| 2,435,020 | 1/1948 | Scranton | 460/116 |
| 2,611,227 | 9/1952 | Keller | 460/116 |
| 2,639,569 | 5/1953 | Pasturczak | 460/116 |
| 3,375,738 | 4/1968 | Love | 74/740 |
| 3,466,854 | 9/1969 | Ashton et al. | 460/116 |
| 3,543,767 | 12/1970 | Witzel | 460/116 |
| 4,160,456 | 7/1979 | Hawkins et al. | 130/27 T |
| 4,248,249 | 2/1981 | Dunn et al. | 130/27 T |
| 4,348,855 | 9/1982 | DePauw et al. | 56/DIG. 15 |
| 4,986,794 | 1/1991 | Ricketts | 460/67 |
| 5,325,656 | 7/1994 | Schreiner et al. | 56/102 H |
| 5,855,108 | 1/1999 | Salz et al. | 56/10.2 G |
| 5,873,227 | 2/1999 | Arner | 56/14.6 |
| 5,947,818 | 9/1999 | Satzler | 460/6 |

*Primary Examiner*—Thomas B. Will
*Assistant Examiner*—Arpad Fabian Kovacs
*Attorney, Agent, or Firm*—Haverstock, Garrett and Roberts; Steven G. Kibby

[57] ABSTRACT

A grain threshing mechanism including a power source having a preselected rotational speed, a concave assembly and a device operably connecting the concave assembly in driven communication with the power source for rotation thereby, a rotor assembly positioned for independent rotation within the concave assembly, and a drive system connecting the rotor assembly in driven communication with the power source for rotation thereby, the drive system including the transmission and a planetary gear set, the transmission being operable for selecting at least one predetermined rotational speed range for the rotor assembly and the planetary gear set being operable for varying the rotational speed of the rotor assembly within the at least one predetermined rotational speed range.

9 Claims, 2 Drawing Sheets

6,059,656

VARIABLE SPEED DRIVE SYSTEM FOR A SYSTEM FOR A ROTOR ASSEMBLY OF A GRAIN THRESHING MECHANISM

TECHNICAL FIELD

The present invention relates generally to drive systems for grain threshing mechanisms and more particularly to a drive system for a rotor assembly of a rotating concave grain threshing system which is operable to vary rotor assembly speeds throughout one or more selectable speed ranges.

BACKGROUND ART

In farming, an incentive exists to improve harvest efficiency. The overall effectiveness of agricultural harvest machinery is dependent upon a combination of its design, reliability, and operating conditions. The primary functional objective of harvesting equipment such as combines is to collect the crop in the minimum amount of time with the least losses and product damage and the lowest capital and operating costs. However, the combine encounters a wide range of harvesting situations and crops. Because of these factors and the potential return obtainable for performance improvements, development of a more effective drive system for the grain threshing mechanism of the combine is desirable.

One known development in grain threshing systems is the rotating concave threshing mechanism which utilizes a rotor assembly positioned within a rotating concave assembly, each driven independently and rotatable in a selected direction one relative to the other. This improved mechanism has increased the productivity and efficiency of threshing grains, but, owing to its construction, is susceptible to stalling when encountering physical properties of the material entering the mechanism which tend to overload the system.

Physical properties which can generate stalling of the threshing system when encountered at normal operating speeds of the system, are for example, intermittent high density of the crop, scattered patches of weeds having exceedingly high moisture content, crops which have been broken down by high winds, hail, and rain, and solid articles such as rocks and wood that are delivered to the threshing system when attempting to harvest such "downed" crops.

Previously used methods of preventing stalling or plugging the threshing mechanism are, for example, slowing down the feed rate of material delivered to the threshing mechanism by slowing down the feeder chain, adjusting the forward speed of the combine, and reversing rotational direction of the rotating concave assembly to clear plugs. These methods have been found to be relatively ineffective in maintaining productivity and efficiency.

One characteristic of the rotating concave threshing mechanism is the rotating speeds required for the rotor assembly. Generally, only a few speeds are required and it is known to employ multi-ratio transmissions in rotor assembly drive systems to provide selectability of predetermined rotor assembly speeds. However, for a more productive and efficient operation, it is desirable to have still greater flexibility in speed selection. Some known threshing systems provide an infinitely variable speed capability. Infinitely variable speed drive systems, however, tend to be bulky, complex, have short component life, and are expensive.

Thus, what is needed is a drive system for the rotor assembly of a combine threshing mechanism that provides the capability to selectably drive the rotor assembly within several distinct speed ranges.

The present invention is directed to overcome one or more of the problems as set forth above.

DISCLOSURE OF THE INVENTION

In one aspect of the invention, a grain threshing mechanism as disclosed including a power source having a preselected rotational speed, a concave assembly and means operably connecting the concave assembly in driven communication with the power source for rotation thereby, a rotor assembly positioned for independent rotation within the concave assembly, and a drive system connecting the rotor assembly in driven communication with the power source for rotation thereby, the drive system including the transmission and a planetary gear set, the transmission being operable for selecting at least one predetermined rotational speed range for the rotor assembly and the planetary gear set being operable for varying the rotational speed of the rotor assembly within the at least one predetermined rotational speed range.

BEST MODE FOR CARRYING OUT THE INVENTION

Figure 1:
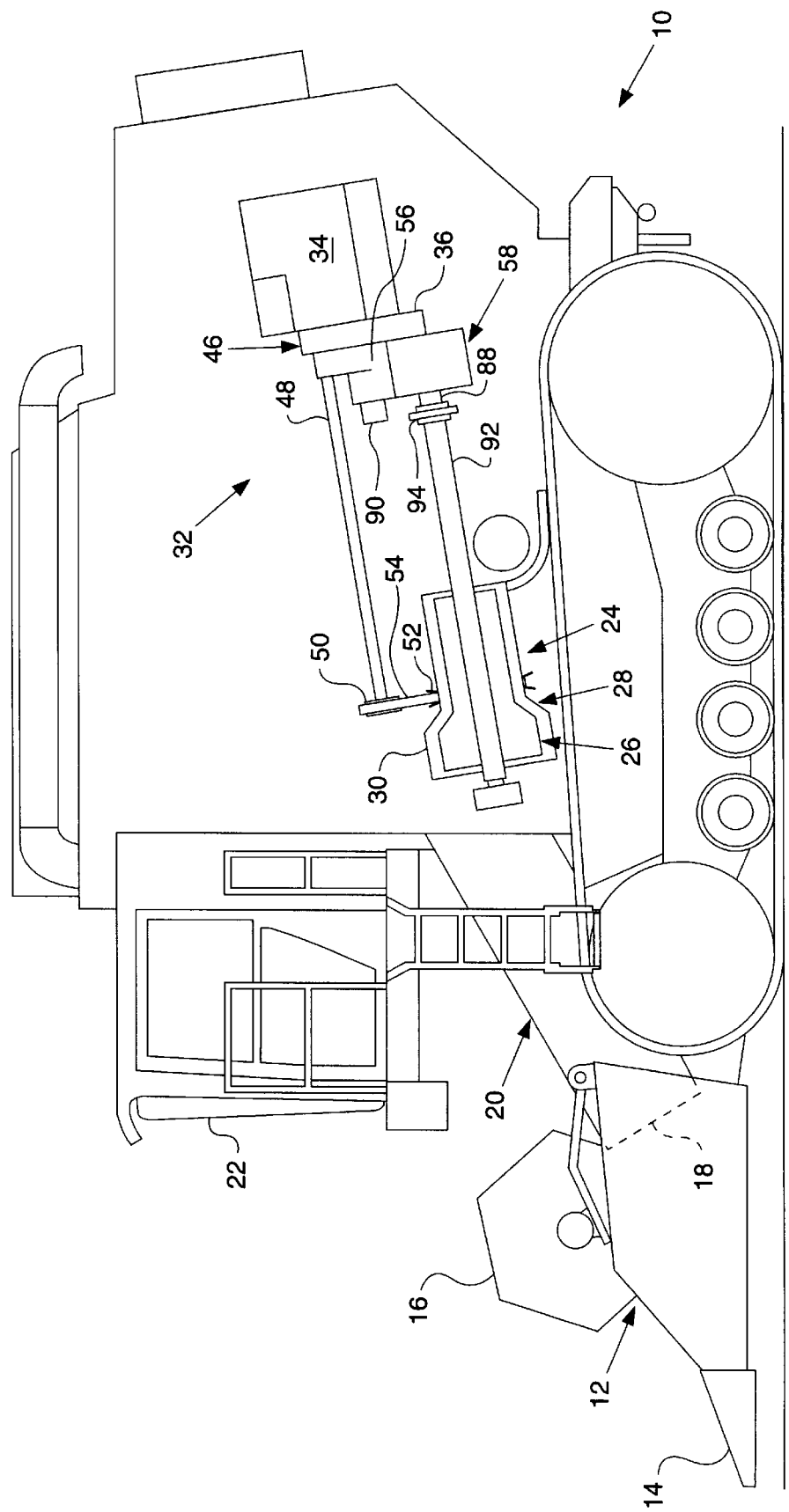
FIG. 1 is a simplified diagrammatic side elevational view of a combine with a portion broken away to show the drive system for the grain threshing mechanism.
Figure 2:
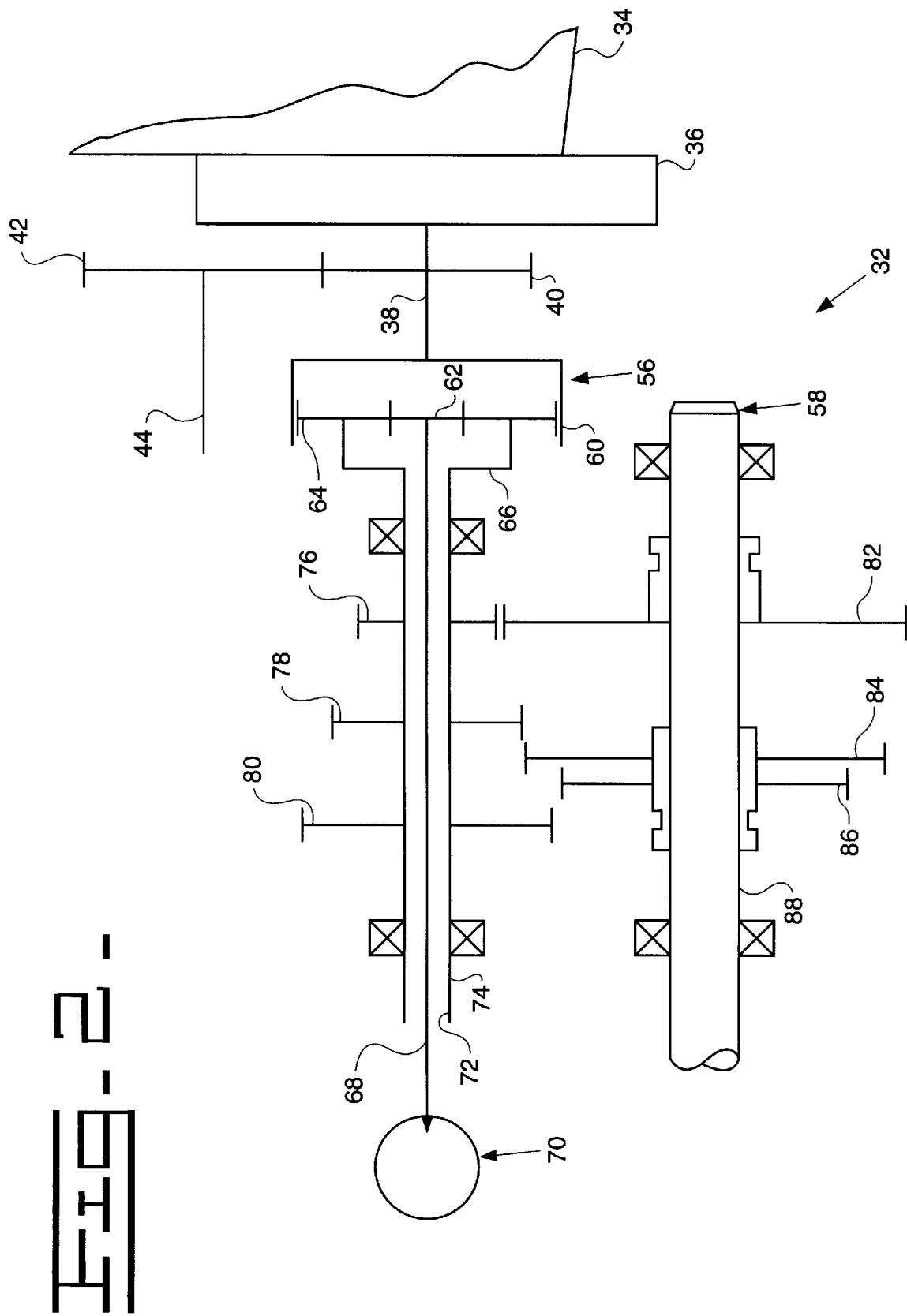
FIG. 2 is an enlarged diagrammatic representation of a portion of the drive system of FIG. 1 for rotating the rotor assembly of the threshing mechanism.

Referring to FIGS. 1 and 2, a combine 10 of this invention has a header 12 for receiving cut crops which have been cut by a sickle 14. The cut crops (not shown) fall into the header 12 and are transported by an auger 16, a portion of which is shown, or other means for moving the cut crops through a discharge port 18 into a crop feeding apparatus or feederhouse 20 located beneath a operator compartment 22 in a conventional manner. The feederhouse 20 transports the cut crops from the header 12 into a rotating concave threshing mechanism 24.

The rotating concave threshing mechanism 24 includes a rotor assembly 26 positioned within a concave assembly 28 with cut crop passing from the feederhouse 20 into an annulus 30 between the rotor assembly 26 and the concave assembly 28.

A drive system 32 is connected to and associated with the concave threshing mechanism 24 for rotating the concave threshing mechanism 24 during the threshing operation. As will be discussed hereinafter in reference to FIG. 2, rotor assembly 26 and concave assembly 28 are connected independently in driven communication to a power source, which in this case is an engine 34 having a preselected rotational speed such that rotor assembly 26 and concave assembly 28 are rotatable in a desired direction one relative to the other. Engine 34, in this example, is a diesel engine having a preselected rotational speed of approximately 2200 revolutions per minute (RPM) referred to herein as the engine operating speed.

Briefly discussing the driving connection of engine 34 to concave assembly 28, referring first to FIG. 2, engine 34 is connected in driving communication to a clutch 36 which in turn is connected in driving communication to a first drive shaft 38, clutch 36 being engageable to transfer motive power from engine 34 to first drive shaft 38 in the conventional manner. A drive gear 40 is mounted on first drive shaft 38 for rotation therewith and is meshed in driving communication with a drive gear 42 mounted on a second drive shaft 44 for rotation therewith. Second drive shaft 44, in turn, is connected in driving communication to a hydrostatic transmission 46 (FIG. 1). Referring to FIG. 1, hydrostatic transmission 46 is connected in driving communication to a third drive shaft 48 having a first pulley 50 mounted thereto for rotation therewith. A second pulley 52 extends around the outer periphery of concave assembly 28 and an endless belt 54 encircles the first pulley 50 and second pulley 52. In operation, with clutch 36 engaged, engine 34 rotates first drive shaft 38 and drive gear 40, which in turn rotate drive gear 42 and second drive shaft 44 to provide power to hydrostatic transmission 46. In turn, hydrostatic transmission 46 is operable to rotate third drive shaft 48, first pulley 50 and second pulley 52 to thereby rotate concave assembly 28. It is recognized that other types of variable speed drives could be used to drive the third drive shaft 48. For example, the drive could also be electric or friction drives.

Referring again to FIG. 2, the portion of drive system 32 for driving rotor assembly 26 includes a planetary gear system 56 connected in driven communication to first drive shaft 38, and a transmission 58 connected in driven communication with planetary gear system 56. Planetary gear system 56 includes a ring gear 60 connected in driven communication with first drive shaft 38, a sun gear 62, and planet gears 64 meshed with both ring gear 60 and sun gear 62. Planet gears 64 are mounted for rotation on a carrier 66. Sun gear 62 is mounted on one end of a fourth drive shaft 68 for rotation therewith, the opposite end of fourth drive shaft 68 being connected in driven communication to a hydraulic motor 70 powered by a hydraulic pump or other suitable device (not shown). Hydraulic motor 70 is operator controlled using conventional means (also not shown) located in operator compartment 22. Fourth drive shaft 68 in turn is mounted for independent rotation in a central passage 72 extending through an input shaft 74 of transmission 58. Input shaft 74, in turn, is mounted in driven communication to carrier 66 of planetary gear system 56. It is recognized that the drive and driven connections of the planetary gear set 56 could be changed. For example, the input shaft 38 could be connected to the carrier 66 and the input shaft 74 connected to the ring gear 60. It is recognized that an electric or friction drive could replace the hydraulic motor 70.

Transmission 58 is a manual transmission of conventional construction and operation having three selectable operating ratios and including a first input gear 76, a second input gear 78 and a third input gear 80 mounted on input shaft 74 for rotation therewith and selectably engageable respectively with a first output gear 82, a second output gear 84, and a third output gear 86, output gears 82, 84, and 86, each being mounted on an output shaft 88 for rotation therewith. Referring back to FIG. 1, shifting between the gears of transmission 58 is accomplished in the conventional manner using a simple ratio selector mechanism 90 which is operator controlled using conventional means (not shown) located in operator compartment 22. Output shaft 88 of transmission 58 is coupled in driving communication with a fifth drive shaft 92 by a coupler 94, and rotor assembly 26 is mounted on fifth drive shaft 92 for driven rotation therewith by output shaft 88.

In operation, driving engagement of first gear 76 with first output gear 82 as shown provides about a 4.2 to 1 ratio of rotational speed between input shaft 74 and output shaft 88, such that, if the input shaft rotational speed equals the engine operating speed of about 2200 RPM, output shaft rotational speed and correspondingly the rotational speed of rotor assembly 26, will be about 500 RPM, which has been found to be a desirable speed for threshing large grains such as corn and soy beans.

With second gear 78 drivingly engaged with second output gear 84 (not shown), a ratio of about 2.8 to 1 between the rotational speed of input shaft 74 and output shaft 88 and consequently rotor assembly 26 is achieved. With input shaft 74 rotating at the engine operating speed of 2200 RPM, the rotor assembly 26 will rotate at approximately 750 RPM, which has been found to be desirable for threshing intermediate size grains such as wheat, flax, milo and oats.

Then, with third gear 80 drivingly engaged with third output gear 86 (again, not shown), a ratio of about 2.1 to 1 between the rotational speed of input shaft 74 and output shaft 88 is achieved, which, with input shaft 74 rotating at the engine operating speed of 2200 RPM, means that the output shaft 88 and rotor assembly 26 would rotate at about 1000 RPM, which is a desirable speed for threshing small grains such as rape, grass and clover.

In operation, it is generally desirable to maintain engine 34 operating at the preselected rotational speed of about 2200 RPM for maintaining constant power to hydrostatic transmission 46 which powers concave assembly 28 and other devices receiving power from second drive shaft 44, while, at the same time, it is desirable to vary the rotational speed of rotor assembly 26 for accommodating different harvesting situations such as different crop densities, moisture contents and crop damage to maintain harvesting productivity and efficiency at desired levels. In this regard, it has been found that the capability to vary the rotational speed of rotor assembly 26 by about plus or minus 10% from the 500 RPM, 750 RPM and 1000 RPM speeds discussed above is sufficient variability to maintain most desired harvesting productivity and efficiency levels. This can be achieved using planetary gear system 56 which is operable to vary the rotational speed of input shaft 74 relative to engine rotational speed under the control of hydraulic motor 70. That is, hydraulic motor 70 is operable to rotate the fourth drive shaft 68 and sun gear 62 to cause input shaft 74 of transmission 58 to rotate either faster or slower relative to first drive shaft 38, depending on the direction of rotation of fourth drive shaft 68 and sun gear 62. In this regard, rotating fourth drive shaft 68 and sun gear 62 in the same direction as input shaft 74 has the effect of increasing the rotational speed of carrier 66 and input shaft 74, thereby proportionally increasing the rotational speed of output shaft 88, fifth drive shaft 92 and rotor assembly 26. Conversely, rotating fourth drive shaft 68 and sun gear 62 in the opposite direction with respect to first drive shaft 38 has the effect of slowing down the rotation of carrier 66, input shaft 74 and correspondingly output shaft 88, fifth drive shaft 92 and rotor assembly 26.

Industrial Applicability

The variable speed drive system for a rotary assembly of a grain threshing mechanism according to the present invention provides a simple, reliable apparatus for maintaining operability and efficiency of a grain threshing system under changing conditions such as when harvesting intermittently high density crops; when harvesting crops containing scattered patches of weeds with high moisture content; and when harvesting downed crops such that solid articles are delivered to the threshing system.

Additionally, the present variable speed drive system can utilize a wide variety of transmission constructions in addition to the three ratio manual transmission discussed above, including manual transmissions having a lesser or a greater number of gear ratios, different gear ratios, and also power transmissions. Still further, while the present drive system provides a variability of about plus or minus 10%, other variable ranges can be selected and utilized with equal utility.

Other aspects, objects, and advantages of this invention can be obtained from a study of the drawings, the disclosure, and the appended claims.

What is claimed is:

1. A grain threshing mechanism comprising:

a power source having a preselected rotational speed;

a concave assembly and means operably connecting the concave assembly in driven communication with the power source for rotation thereby;

a rotor assembly positioned for independent rotation within the concave assembly; and a drive system connecting the rotor assembly in driven communication with the power source for rotation thereby, the drive system including a transmission and a planetary gear set, the transmission being operable for selecting at least one predetermined rotational speed range for the rotor assembly and the planetary gear set being operable for varying the rotational speed of the assembly within the at least one predetermined rotational speed range.

2. The grain threshing mechanism, as set forth in claim 1, wherein the drive system further comprises at least one gear variably rotatable under control by an operator for varying the rotational speed of the rotor assembly.

3. The grain threshing mechanism, as set forth in claim 2, wherein the drive system further comprises a motor controllable by the operator to vary the rotation of the at least one gear for varying the rotational speed of the rotor assembly.

4. The grain threshing mechanism, as set forth in claim 3, wherein the planetary gear set is connected in driving communication with the transmission.

5. The grain threshing mechanism, as set forth in claim 4, wherein the planetary gear set comprises a ring gear, a plurality of planet gears mounted for rotation on a carrier, and a sun gear, the ring gear being connected in driven communication with the power source, the transmission being connected in driven communication with the carrier and the sun gear being connected in driven communication with the motor.

6. A grain threshing mechanism, as set forth in claim 1, wherein the transmission is a multi-ratio transmission.

7. A grain threshing mechanism, as set forth in claim 1, wherein the power source is an engine operated at a constant rotational speed and said transmission is a multi-ratio transmission connecting said planetary gear set in driving communication with said rotor assembly according to one of a plurality of selectable operating ratios.

8. A grain threshing mechanism, as set forth in claim 1, wherein the transmission is a multi-ratio transmission having a gear selection mechanism for manually selecting a fixed rotational speed ratio between a transmission input shaft and a transmission output shaft in driving communication with said rotor assembly.

9. A grain threshing mechanism comprising:

a power source operating at a substantially constant rotational speed;

a concave assembly in driven communication with the power source for rotation thereby;

a rotor assembly positioned for independent rotation within the concave assembly; and a drive system connecting the rotor assembly in driven communication with the power source for rotation thereby, the drive system including a transmission and a planetary gear set, the transmission having selectable operating ratios for providing a plurality of rotational speed ranges for the rotor assembly and the planetary gear set being operable for varying the rotational speed of the rotor assembly within the said speed ranges.

* * * * *